March 7, 1950  T. DE FOREST ET AL  2,499,467
METHOD OF DETECTING SURFACE DISCONTINUITIES
Filed June 21, 1947
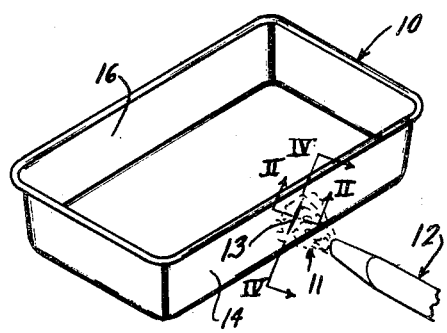
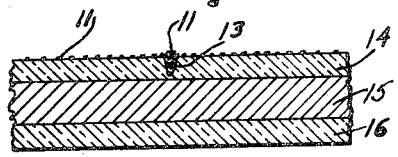
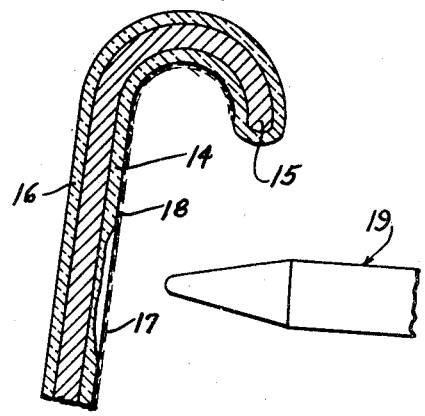
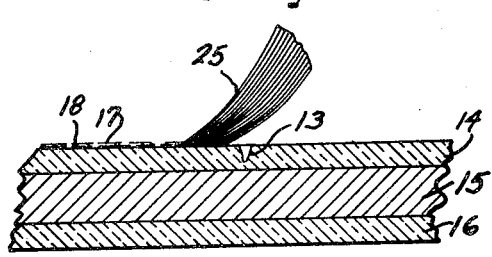
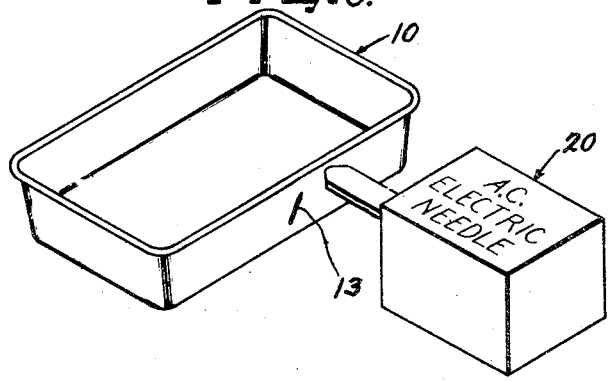
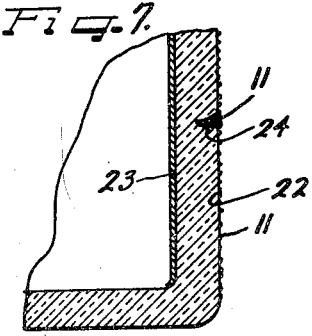
Inventors
Taber De Forest
Henry N. Staats
By The Firm of Charles W. Hills Attys.

Patented Mar. 7, 1950

2,499,467

UNITED STATES PATENT OFFICE 2,499,467

METHOD OF DETECTING SURFACE DISCONTINUITIES

Taber de Forest, Northbrook, and Henry N. Staats, Chicago, Ill., assignors to Magnaflux Corporation, Chicago, Ill., a corporation of Delaware Application June 21, 1947, Serial No. 756,230

12 Claims. (Cl. 175—183)

This invention relates to a method of detecting surface discontinuities in surfaces having relatively poor electrically conductive properties. More particularly, the invention relates to a method of testing for surface discontinuities, such as cracks or the like, in articles formed of or surfaced with ceramic, plastic or other materials that may be generally referred to as dielectrics.

In our copending application "Method of detecting surface discontinuities in electrically poor conductive surfaces," Serial No. 648,234, filed February 18, 1946, we disclosed a method of testing articles such as glass bottles by first wetting the surface of the bottle, and then drying the surface superficially, whereupon electrostatically charged finely divided particles directed thereagainst are attracted to the cracks and adhere thereto in preference to the unblemished or continuous portions of the surface. The present application is a continuation-in-part of this copending application and is based upon the discovery that surfaces, having poor conductive properties, but backed by conductive material, preferentially attract charged particles to any discontinuities therein without the necessity of first wetting the surface as disclosed in our copending application.

Under the preferred conditions for carrying out our invention, the electrostatically charged particles build up at the cracks in well-defined, comparatively dense agglomerations coextensive with the cracks. The result is a very definite indication not only of the presence and location of any cracks in the surface to which the electrostatically charged particles are applied, but also of the relative dimensions of the cracks. By the use of solid particles of a color contrasting with the color of the surface undergoing test, very distinctive visual indications are given the observer of any cracks or discontinuities in the surface. There is thus provided a simple and quick method of testing for cracks and other surface discontinuities in electrically poor conductive materials.

There are a great many applications of the method of our invention that have considerable commercial significance. For instance, in metal backed enamelware, if cracks are present in the enamel, such cracks provide points of attack for rust to form on the metal backing, eventually causing the enamel to flake off.

The primary advantage of the present method is, of course, the advantage of eliminating a step or possibly two steps from the method of our prior copending application. For example, it would be unnecessary either to wet the surface of the metal backed enamelware or to superficially dry the same, but only to apply the gaseous suspension of electrostatically charged particles to the surface for preferential attraction to any discontinuities. Our present method therefore has the advantage of greater economy and efficiency, while producing substantially the same results.

While our copending application particularly discloses the step of directing a gaseous suspension of electrostatically charged particles against a surface to be tested, we have found that very satisfactory results can also be obtained by dispersing over a surface which has a backing of conductive material, a liquid suspension or solution of particles, and charging the conductive backing before or after the liquid suspension is applied.

Furthermore, it has been found that articles having thin dielectric surfaces, as for example bottles, may be tested by placing a piece of tinfoil or other conducting material behind the surface to be tested and directing a gaseous suspension of charged particles thereagainst. With relatively thin dielectric surfaces, it has been found satisfactory if the operator's hand is placed behind the surface undergoing test.

It is therefore an important object of our invention to provide a method of detecting surface discontinuities in materials that are relatively poor conductors of electricity, whereby any surface discontinuities may be rendered clearly visible to the unaided eye of an inspector and not only the existence of such surface discontinuity but also its approximate size and extent may be made readily apparent.

It is a further important object of this invention to provide a method of detecting the existence of cracks in electrically non-conductive surfaces, such as ceramic or plastic surfaces and the like, having relatively good dielectric properties, the method comprising the application to such a surface of a fluid suspension of finely divided particles which, by virtue of an electrostatic affinity setup between the particles and a conducting medium adjacent such surface, are caused to be preferentially attracted to the cracks, if any, in such surface and to form adherent agglomerations, or deposits, at such cracks that render the presence and location of the cracks clearly visible.

It is a further important object of this invention to provide a method for testing surfaces for discontinuities in accordance with which a surface to be tested is backed with an electrically conductive medium and an electrostatic affinity having been established between such conductive medium and finely divided particles dispersed over the surface, the charged particles are preferentially attracted to and caused to adhere as readily visible agglomerations or deposits at any discontinuities in the surface.

Other and further important objects of this invention will become apparent from the disclosures in the specification and the accompanying drawings.

On the drawings:

Figure 1 is a fragmentary isometric view illustrating the first embodiment of the method of our invention in which a gaseous suspension of charged particles is directed against the surface to be tested;

Figure 2 is an enlarged fragmentary sectional view taken substantially along the line II—II of Figure 1 showing the end result of the first embodiment of our method;

Figure 3 is an enlarged fragmentary sectional view taken substantially along the line II—II of Figure 1 and illustrating the step, in the second embodiment of the method of our invention, of applying to the surface to be tested a liquid suspension of particles, as by brushing the liquid on the surface;

Figure 4 is an enlarged fragmentary sectional view taken substantially along the line IV—IV of Figure 1 and illustrating the step of charging the conductive backing by means of an electrode after the application of the particles in the liquid suspension to the surface as shown in Figure 3;

Figure 5 is an enlarged fragmentary sectional view taken substantially along the line II—II of Figure 1 and illustrating the result accomplished by the second embodiment of our method;

Figure 6 is an isometric view of another embodiment of the method of our invention wherein the conductive backing is charged prior to the application of a liquid suspension of particles to the surface to be tested; and Figure 7 is a fragmentary sectional view of the result of a still further embodiment of the method of our invention wherein a conductive material is inserted behind a thin dielectric surface, not metal backed, and a gaseous suspension of charged particles directed thereagainst.

As shown on the drawings:

The method of our invention will first be described in connection with the testing of a metal backed enamel pan or tray, or the like, to detect the presence of cracks or other surface discontinuities that would render the tray undesirable for use. In general, however, any surface having a backing of conductive material and that is a relatively poor conductor of electricity, or, as a corollary, has relatively good dielectric properties, can be tested in accordance with the method of our invention. By way of example, articles that are surfaced with ceramic or plastic materials, or other relatively poor conductive materials, may be tested by the method of our invention for the presence of cracks and other surface discontinuities, and especially such cracks as are not readily discernible by a quick inspection with the unaided eye.

In the first embodiment of our invention illustrated in Figure 1, an enamel tray 10 of the type which is metal backed is the specimen to be tested. The surface of the tray to be tested may first be preheated. We have found that this preheating improves the result in cases where the circumambient air has a rather high relative humidity. Preheating is not, however, necessary where the relative humidity is low.

The tray is then subjected to a gaseous suspension of finely divided solid particles 11 which are electrostatically charged by means of a hard rubber nozzle 12 due to friction set up between the particles and the internal surface of the nozzle. A comparatively high electrostatic charge is imparted to the finely divided particles by virtue of the frictional contact between the particles and the internal wall surface of the nozzle, and particularly is this so if the finely divided particles and the gaseous current used to suspend them are both relatively dry.

Other means for imparting electrostatic charge to the particles may be used. For instance, a metal nozzle may be used in place of the hard rubber nozzle and a Toepler-Holtz static generator, or other suitable type of static generator, may be connected to the metal nozzle for imparting electrostatic charge to the particles passing therethrough.

As illustrated in Figure 2, if the tray 10 has a crack in it, the solid particles 11 will collect at the crack indicated by reference numeral 13 and form a deposit thereon, the extent of which will roughly correspond with the extent of the crack and the thickness of which will depend in part upon the density of the solid particles per unit volume of the gas stream and the length of time during which the particle laden gas stream is directed against the portion of the tray surface including the crack. The general disposition of the particles 11 about the crack 12 is illustrated in Figure 2 in cross section, wherein the reference numeral 14 designates an enamel surface having the crack 13 therein and backed with a metal liner 15 and the reference numeral 16 indicates the inner enamel surface.

As indicated in Figure 3, the method of our invention may also be carried out by first applying to the surface of the tray to be tested, as by means of a brush 25, a liquid 17 having relatively poor conducting properties in which are suspended particles 18 (Figure 3), as for instance, pigment or metal particles, and then bringing in proximity to said tray an electrode 19 (Figure 4). The electrode is adapted to produce either an alternating current or direct current "spark" between the tip thereof and the tray surface 14. The voltage for the electrode may be produced by either Toepler-Holtz machine or Tesla coil.

Suitable liquids for this purpose are oils containing dye, such as lubricating oil SAE 10 and 20, olive oil, diethylene glycol, and cotton seed oil. Kerosene and carbon tetrachloride will also work providing the results are noted at the time the electrode is applied. The heavier oils tend to remain in ridges after the charging electrode 19 is removed. Naturally solvents which are highly inflammable should be avoided. In general, animal, vegetable or mineral oils may be satisfactory.

Where the vehicle is an oil, any oil soluble dye may be used, such as Du Pont's oil red, any of Glyco Chemical's Glycolors, such as red, brown, blue. Sudan yellow G. G. A. made by General Dyestuffs is also good. Pigments which have been found satisfactory are toluidine red, Permanssa red, iron oxide, and cobalt blue. These pigments may be suspended in any light insulating solvent such as kerosene, mineral seal oil, or carbon tetrachloride.

As indicated in Figure 5, it has been found that after the tray is treated in the manner set forth above, the particles tend to build up so extensively with any discontinuities in the surface, such as crack 13, and particularly if the particles of color contrasting with the surface to be tested, a readily visible indication of any cracks or other discontinuities is produced.

A further embodiment of our method is shown in Figure 6 wherein an instrument 20 such as alternating current electric needle or a static machine is first brought into proximity with the tray 10, and particles 18 then applied suspended in a thin insulating solvent 17 (Figure 3). A fine aluminum powder is particularly good, although iron oxide also works quite well. This embodiment of our method would have certain production advantages, since parts to be tested could be merely charged, dipped and drained without the necessity of manipulating a needle.

The operation of our method probably is explained by saying that the conductive backing acquires an electrostatic charge adjacent the surface to be tested relative to the particles, or, in other words, that a difference in electrostatic potential or charge exists between the particles and the conductive backing. As a consequence of this potential difference, the particles are attracted to or an electrostatic affinity is set up between the particles and the conductive backing of the surface to be tested. Thus, where there are any discontinuities present in the surface, as for example a crack, due to the relative nearness of the backing at any particular point where the crack is present, the particles are preferentially attracted thereto. The purpose of the fluid in which the particles are suspended is probably to facilitate flowing of the particles over the surface.

Thus, according to our method, if some means for attracting charged particles is provided behind the surface to be tested and preferably over a wide area thereof, cracks therein will preferentially attract such particles suspended in a fluid medium.

As shown in Figure 7, a surface 22 of an article to be tested, which is not metal backed, will also give good results if a human hand or other conducting mass, here a thin sheet of tinfoil 23, is placed on the side opposite that to be tested and a gaseous suspension of charged particles 11 are directed thereagainst in the manner illustrated in Figure 1. A large area of contact is desirable for insuring that the particles 11 will be preferentially attracted to crack 24 as depicted in Figure 7. Typical of the articles which may be tested in this manner are fired cups and plates and other relatively thin dielectric goods. Bottles will also work if a conductor, such as tinfoil, is placed on the inside.

In our copending application, the operation may be explained by assuming that the wetting agent acts as a conductor and after a preliminary drying or evaporation, such wetting agent is predominant only at any discontinuities internally of the superficially dried surface, where the drying or evaporation is less efficient.

Thus, broadly, we have discovered a method for detecting discontinuities in a surface by providing conductive matter behind the surface, in other words, in any position not actually on the surface proper, whether within the material whose surface is under test as in my copending application or backing the material as disclosed in this application. Furthermore, it is unnecessary that the conductive matter be in actual contact with the material of the surface under test, but it may be spaced rearwardly therefrom.

By "behind" the surface, therefore, we mean any of the three above dispositions. Also we mean by the word "backing," any conductive matter disposed adjacent the rear surface of the material whose front surface is under test, whether in contact with the rear surface or spaced therefrom.

It will, of course, be understood that various details may be varied through a wide range without departing from the principles of this invention, and it is, therefore, not the purpose to limit the patent granted hereon otherwise than necessitated by the scope of the appended claims.

We claim as our invention:

1. In a method of detecting discontinuities in surfaces of poor electrical conductivity having a material of effective conductivity disposed therebehind, the step of directing a gaseous suspension of electrostatically charged particles against the surface of poor electrical conductivity to be tested, whereupon a preferential attraction of said particles to a portion of said surface serves to indicate the position and extent of any surface discontinuities present.

2. In a method of detecting discontinuities in surfaces of poor electrical conductivity but having a backing of better conductivity, the step of distributing over the surface a fluid suspension of particles having an electrostatic potential different from that of the conductive backing, whereupon a preferential attraction of said particles to a portion of the said surface serves to indicate the position and extent of any surface discontinuities present.

3. In a method of detecting discontinuities in surfaces of poor electrical conductivity but having therebehind matter of better conductivity, the step of dispersing over the surface to be tested a suspension of particles in a fluid of poor conductivity relative to said matter, a difference of electrostatic potential existing between the particles and the conductive matter, whereby with an electrostatic affinity established between said particles and said conductive matter a preferential attraction of such particles to a portion of said surface serves to indicate the position and extent of any surface discontinuities present.

4. The method of detecting discontinuities in surfaces of poor electrical conductivity but having a backing of better conductivity comprising the steps of electrostatically charging the conductive backing adjacent said surface, and distributing over the surface to be tested a suspension of particles in a fluid which is poorly conductive relative to the backing, whereupon a preferential attraction of such particles to a portion of said surfaces serves to indicate the position and extent of any surface discontinuities present.

5. The method of testing for discontinuities in a surface of poor electrical conductivity backed by material having better conductive properties comprising the step of exposing the surface to a fluid suspension of charged particles, whereupon a preferential attraction of said particles to a portion of said surface serves to indicate the position of any surface discontinuities present.

6. The method of testing for discontinuities in surfaces of poor electrical conductivity comprising the steps of providing a conductive backing for said surface and exposing said surface to a fluid suspension of charged particles, whereupon a preferential attraction of said particles to a portion of said surface indicates the position of any surface discontinuities present.

7. The method of testing for discontinuities in surfaces of poor electrical conductivity which are backed by electrically conductive material comprising the steps in either order of subjecting the surface to a fluid suspension of particles and establishing an electrostatic affinity between said particles and the conductive backing, whereby a preferential attraction of said particles to a portion of said surface serves to indicate the position of any surface discontinuities present.

8. The method of testing for discontinuities in surfaces of poor electrical conductivity backed by a conductor comprising the steps in either order of dispersing a fluid suspension of particles over the surface to be tested and bringing a source of electric potential in proximity to said surface, to create an electrostatic potential difference between said conductor and said particles whereupon a preferential attraction of said particles to any surface discontinuities will occur.

9. The method of testing for discontinuities in surfaces of poor electrical conductivity comprising the steps of supplying a relatively good conductive medium behind said surface in the vicinity of a discontinuity to be detected therein and dispersing over said surface a fluid suspension of particles of electrostatic potential different from that of said conductive medium, whereby there will be preferential attraction of said particles to said discontinuity.

10. The method of testing for discontinuities in surfaces of poor electrical conductivity comprising the steps of supplying a conductive medium behind a discontinuity in the surface to be tested and dispersing over the surface finely divided particles having an electrostatic influence on said conductive medium, whereby a preferential attraction of said particles to a portion of said surface serves to indicate the position of the discontinuity.

11. The method of testing for discontinuities in surfaces of poor electrical conductivity which have a relatively good electrical conductor behind such surfaces, comprising the steps of dispersing over the surface to be tested finely divided particles in fluid suspension and creating an electrostatic potential difference between the conductor and the particles to preferentially attract particles to any discontinuities in the surface.

12. The method of testing for discontinuities in surfaces of poor electrical conductivity comprising the steps in either order of dispersing particles suspended in fluid over the surface to be tested and supplying a conductor behind said surface, the conductor having an electrostatic charge relative to said particles whereby the particles are preferentially attracted to any surface discontinuities present.

TABER DE FOREST.
HENRY N. STAATS.

REFERENCES CITED

The following references are of record in the file of this patent:

UNITED STATES PATENTS

| Number | Name | Date |
| --- | --- | --- |
| 2,259,400 | Switzer | Oct. 14, 1941 |
| 2,340,940 | De Forest | Feb. 8, 1944 |
| 2,420,646 | Bloom | May 20, 1947 |